Dec. 19, 1967  M. MANN  3,358,428
GAS DRYER
Filed April 16, 1965
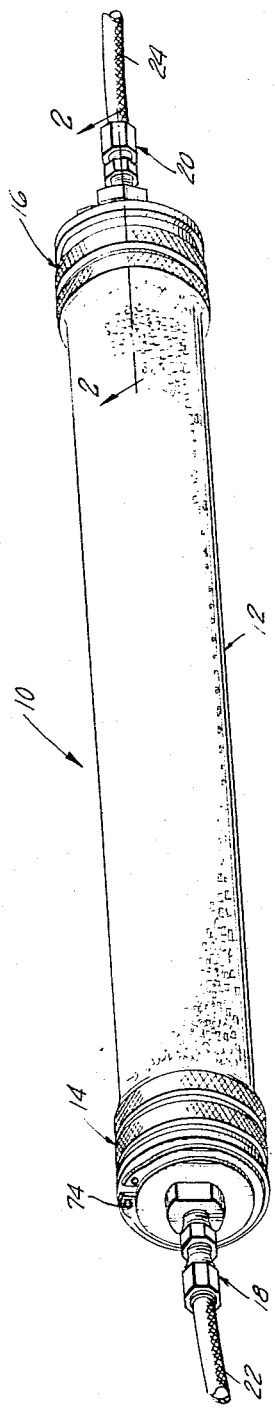
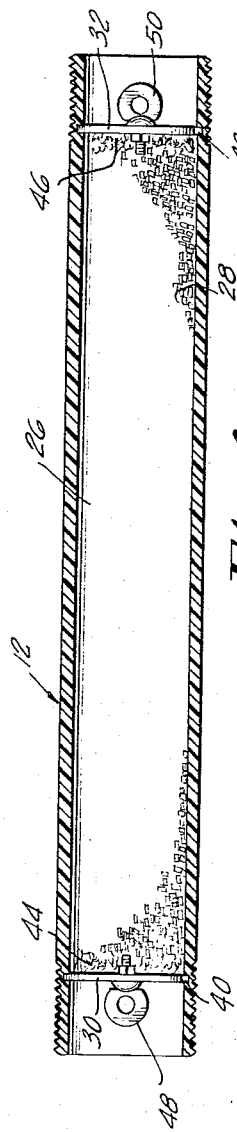
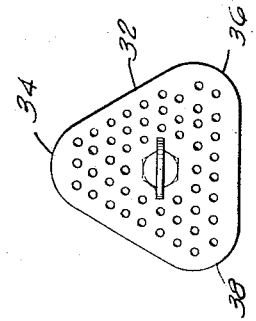
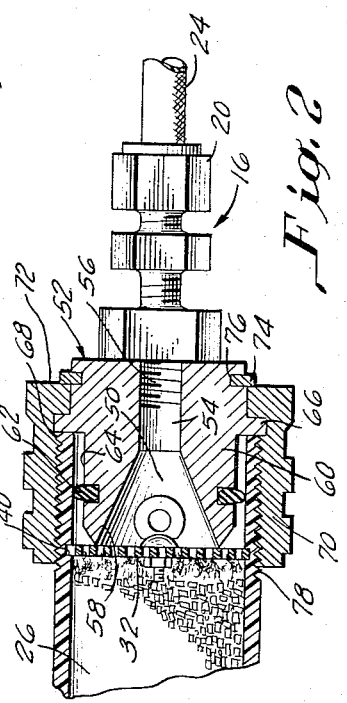
INVENTOR
Morley Mann
BY *Olson, Trexler, Wolters & Bushnell*
ATTORNEYS

United States Patent Office 3,358,428
Patented Dec. 19, 1967

3,358,428
GAS DRYER
Morley Mann, Villa Park, Ill.
(202 W. Fay Ave., Addison, Ill. 60101)
Filed Apr. 16, 1965, Ser. No. 448,766
6 Claims. (Cl. 55—387)

The present invention relates to a novel device adapted to be connected in a gas line for drying the gas.

Gas dryers of the general type contemplated herein include a tube or the like containing a quantity of desiccant material and fittings at opposite ends of the tube connectable in a gas line. As is known, it is periodically necessary to remove and replace the desiccant material in the tube when it becomes saturated with moisture, and heretofore suggested gas dryers have been constructed so that such removal and replacement of the desiccant material is relatively difficult and time consuming.

An important object of the present invention is to provide a novel gas dryer constructed so that it may be readily assembled and disassembled without the necessity of using wrenches or other tools whereby to facilitate the removal and replacement of the desiccant material.

A further important object of the present invention is to provide a novel gas dryer having a tube or cartridge filled with desiccant material and opposite end fittings connected with a gas line and constructed so that the tube or cartridge may be easily assembled with or removed from the end fittings without losing or spilling the desiccant material.

Still another object of the present invention is to provide a novel gas dryer of the above described type which is of simple, economical and long-lasting construction.

Other objects and advantages of the present invention will become apparent from the following description and the accompanying drawings wherein:

FIG. 1 is a perspective view showing a gas dryer incorporating features of the present invention connected in a gas line;

FIG. 2 is a fragmentary sectional view taken along line 2—2 in FIG. 1;

FIG. 3 is a view showing an element of the dryer structure; and

FIG. 4 is a sectional view showing a cartridge portion of the dryer device separated from the opposite end fittings.

Referring now more specifically to the drawings wherein like parts are designated by the same numerals throughout the various figures, a gas dryer 10 incorporating features of the present invention is shown in FIG. 1. The dryer comprises central cartridge 12 and opposite end fitting assemblies 14 and 16. The opposite end fittings are connectable with pipe fittings or coupling elements 18 and 20 of known construction which in turn are connected to opposite portions 22 and 24 of a gas line.

The cartridge portion 12 of the gas dryer comprises an elongated tube 26 substantially filled with a quantity of granulated desiccant material 28. Preferably the tube 26 is formed from a clear plastic material so that the condition of the desiccant may be readily observed.

The desiccant material is retained within the tube by screen elements 30 and 32 which are constructed as shown best in FIG. 3. The screen elements are of a generally triangular configuration and have rounded corners 34, 36 and 38 adapted to snap into grooves 40 and 42 respectively adjacent to but spaced axially inwardly from opposite ends of the tube 26. Preferably layers 44 and 46 of glass wool or other filter material are provided between the screen and the desiccant. Axially projecting elements 48 and 50 are secured to the screens 30 and 32, which elements provide small handles and are adapted to be grasped between the fingers of a workman for enabling the screens to be snapped into or out of the tube.

It will be appreciated that the cartridge 12 may be removed from the end fitting means 14 and 16 and handled as a unit without spilling or losing desiccant material as long as the retainer screens 30 and 32 are in place. However, the tube may be easily recharged with fresh desiccant material by manually pulling one of the retainer screens out and then pouring out the used desiccant and replacing it with new. The retainer screen is then easily snapped back into position.

The end fitting assemblies 14 and 16 are identical and therefore only the fitting assembly 16 shown in FIG. 2 will be described in detail. The fitting 16 comprises a body member or plug 52 having a central bore 54 therethrough. An outer end portion of the bore is internally threaded as at 56 for accommodating the pipe fitting 20. An inner end of the bore 50 is enlarged as at 58 for providing a clearance for the handle element 50 assembled with the retainer screen 32.

The plug 52 has a cylindrical portion 60 adapted to extend within an end of the tube 26. An O-ring 62 is disposed in a groove 64 formed in the cylindrical portion for sealing engagement with a cylindrical surface 64 of the tube. Preferably the cylindrical surface 64 is machined so as to promote smooth uniform engagement with the O-ring 62 and effective sealing action.

An annular flange 66 projects radially outwardly from the cylindrical portion 60 of the plug, which flange is adapted to engage the end 68 of the tube 26 and thereby limit downward movement of the plug. It is to be noted however, that the seal is provided between the O-ring 62 and tube and therefore the flange 66 need not be forced into engagement with the end of the tube.

An internally threaded ring or nut element 70 is assembled over the plug or body member 52 and has an inturned flange 72 overlying the flange 66. A snap-ring 74 engages in a groove 76 in the plug or body member 52 for retaining the internally threaded ring 70 in assembled relationship. The internally threaded ring 70 is cooperable with external threads 78 formed on an end portion of the plastic tube 26. The threaded ring 70 serves to retain the plug 52 in the plastic tube with the O-ring 62 in sealing engagement with the wall 64. As previously indicated, it is unnecessary to force the flange 66 of the plug against the end of the tube and therefore the threaded ring may be easily tightened or loosened by hand and without the aid of a wrench or tool. If desired, the external surface of the ring may be knurled for facilitating hand turning.

With the structure described above, it will be appreciated that the cartridge 12 may be easily assembled with the end fitting means 14 and 16 by handturning the threaded rings of the end fitting means without the aid of special tools. Furthermore, the cartridge 12 may be either removed and replaced or the desiccant material may be removed and replaced without spilling or losing the material and without the aid of special tools.

While a preferred embodiment of the present invention has been shown and described herein it is obvious that many structural details may be changed without departing from the spirit and scope of the appended claims.

The invention is claimed as follows:

1. A gas dryer comprising an elongated tube for containing a mass of granulated desiccant material, first and second perforated retainers respectively removably disposed within opposite end portions of said tube for retaining the desiccant material, first and second end fitting means removably connected with opposite ends of said tube being connectable in a gas line, said tube including first and second internal annular notch means adjacent opposite ends thereof and said retainers comprising thin flexible polygonal elements having corner portions adapted to be snapped into said notch means, and axially projecting gripping elements connected to said flexible elements for enabling said flexible elements to be manually snapped into and out of groove means.

2. A gas dryer, as defined in claim 1, wherein said tube means includes internal smooth cylindrical walls and end portions thereof axially outwardly of said groove means, and each of said end fitting means comprises a body member projecting axially within said wall of an associated end portion, and an O-ring carried by said body member and slidably and sealingly engageable with said wall.

3. A gas dryer comprising a tube for containing a mass of desiccant material and including an end portion having an internal cylindrical wall, a body member including a portion axially telescopingly fitting within said end portion of the tube, annular seal means between said body member portion and said wall, means releasably securing said body member with respect to said end portion, said last named means comprising an annular member encircling and releasably engaging said tube, and interengaging rotative coupling means on said annular and body members connecting said members for rotation relative to each other and against relative axial movement, said annular member being rotatable relative to said tube for loosening and tightening, said annular member forcing said body member into the tube end portion during tightening and out of the tube during loosening wherein said rotative coupling means comprising inturned annular flange means on said annular member, and first and second axially spaced annular abutment means on said body member and embracing said annular flange means.

4. A gas dryer, as defined in claim 3 wherein one of said annular abutment means comprises a snap ring releasably engaging said body member, and groove means in the body member receiving said snap ring.

5. A gas dryer, as defined in claim 3, wherein said body member portion comprises annular groove means, and said seal means comprises an O-ring disposed in said groove means and slidably engaging in said wall.

6. A gas dryer, as defined in claim 5, wherein said tube end portion comprises external helical convolutions, and said annular member comprises an internally threaded member.

References Cited
UNITED STATES PATENTS

| | | | |
|---|---|---|---|
| 2,199,258 | 4/1940 | Gray | 55—387 X |
| 2,728,407 | 12/1955 | Squier | 55—387 X |
| 2,845,138 | 7/1958 | Gageby | 55—359 X |
| 3,208,203 | 9/1965 | Markevitch | 55—387 |

REUBEN FRIEDMAN, *Primary Examiner.*

J. W. ADEE, *Assistant Examiner.*